Figure 10:
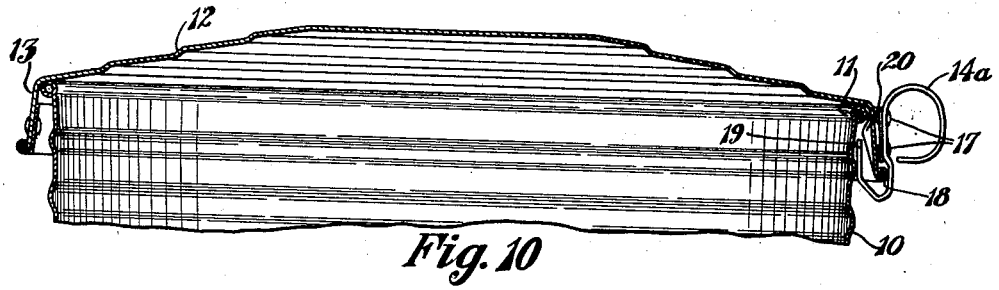

Nov. 5, 1940.     R. G. CURTIS     2,220,318
RECEPTACLE COVER
Filed Sept. 18, 1937     5 Sheets-Sheet 1
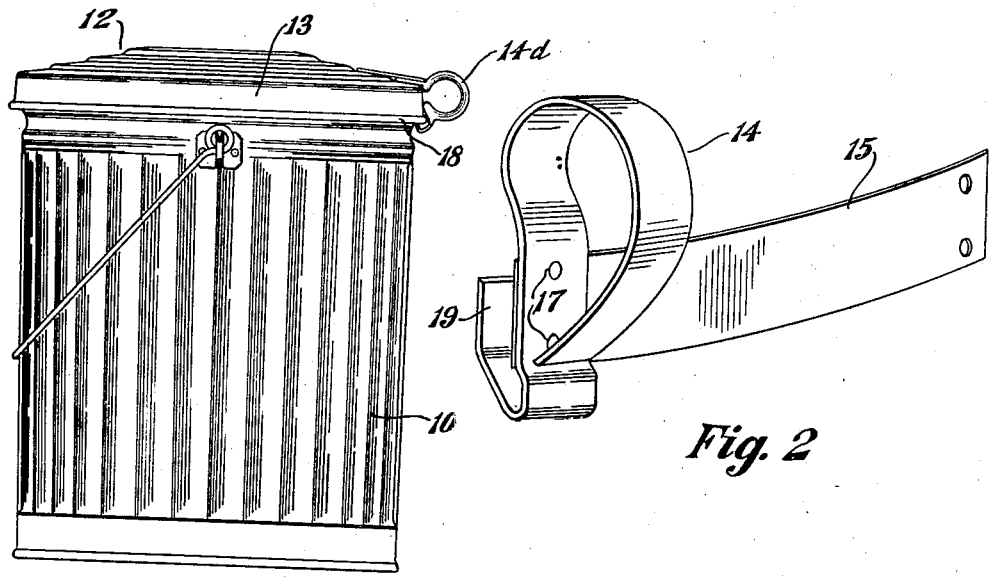
Fig. 1
Fig. 2
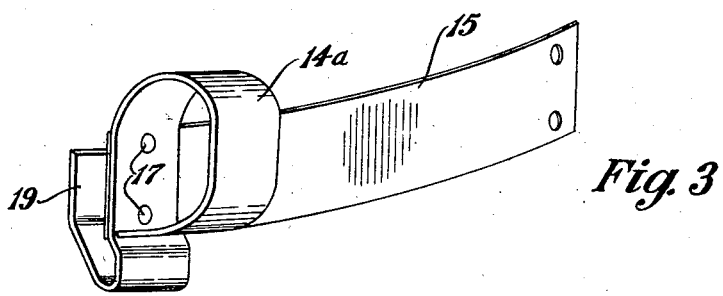
Fig. 3
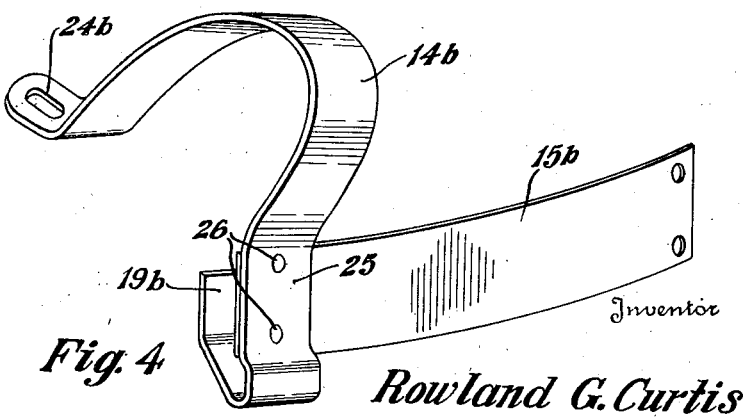
Fig. 4
Inventor
Rowland G. Curtis
By Freast and Bishop
Attorneys

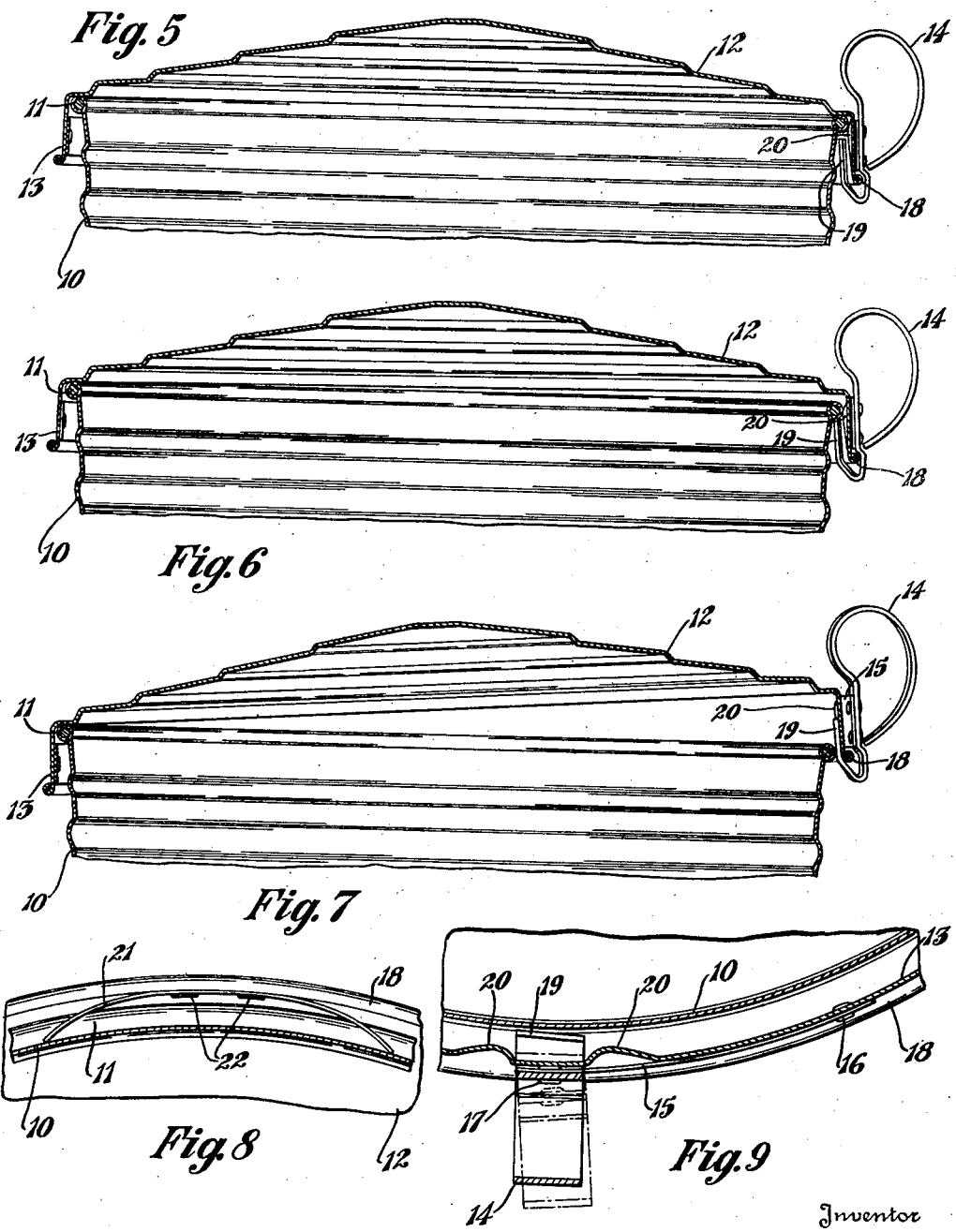

Nov. 5, 1940.  R. G. CURTIS  2,220,318
RECEPTACLE COVER
Filed Sept. 18, 1937  5 Sheets-Sheet 4
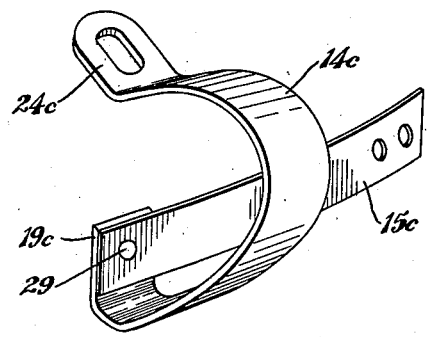
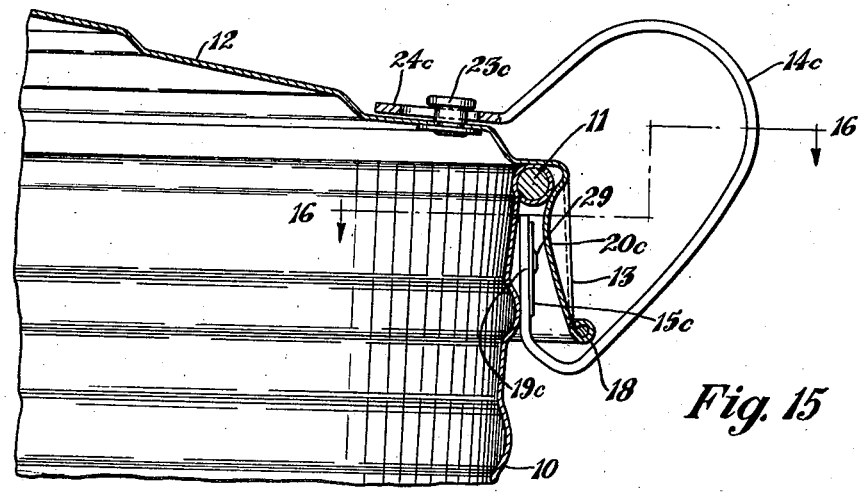
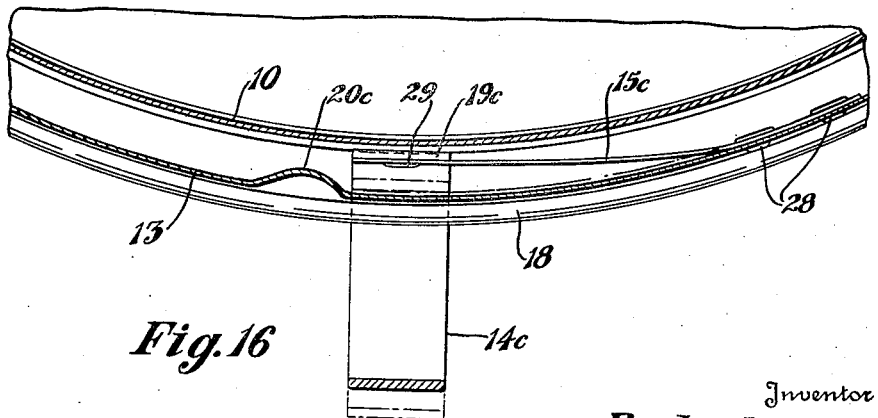
Inventor
Rowland G. Curtis
By Fraser and Bishop
Attorneys Nov. 5, 1940.                    R. G. CURTIS                    2,220,318
                              RECEPTACLE COVER
                            Filed Sept. 18, 1937              5 Sheets-Sheet 5

Inventor
Rowland G. Curtis
By Frease and Bishop
Attorneys

Patented Nov. 5, 1940

2,220,318

UNITED STATES PATENT OFFICE 2,220,318

RECEPTACLE COVER

Rowland G. Curtis, Dover, Ohio, assignor to Reeves Steel and Manufacturing Company, Dover, Ohio, a corporation of Ohio Application September 18, 1937, Serial No. 164,548

18 Claims. (Cl. 220—56)

The invention relates to receptacles provided with removable self-locking covers, more particularly to the covers for garbage cans and the like where it is desirable to prevent lifting or removal of the cover either by the force of the wind or by dogs or other animals attempting to get at the contents of the receptacle, and more especially to improvements upon the type of cover lock or latch disclosed in my prior application, Serial No. 125,581, filed February 13, 1937, and allowed August 26, 1937.

The invention relates more particularly to the particular type of covers having a hinged or movable handle mounted near one side of the cover and provided with an inturned latch portion disposed between the depending rim of the cover and the side of the receptacle and adapted to engage beneath the usual rim bead of the receptacle to normally hold the cover locked upon the receptacle unless the handle is moved by the operator to withdraw the latch portion thereof from the locked position to a point between inwardly disposed projections on the rim flange of the cover for the purpose of removing the cover.

It is known that covers having movable locking or latching handles have been produced in the past, such as Loeber Patents No. 1,358,380, No. 1,856,877, No. 1,884,763, No. 1,977,641, and Jamison Patent No. 1,961,223, but in all of these patents, as well as in my prior application above referred to, the latching portion of the handle extended through an aperture, opening or slot in the rim flange of the cover, and it is a primary object of the present improvement to provide a latching handle for such covers, adopting the new principle of inwardly disposed projections upon the cover rim, as disclosed and claimed in my prior application, Serial No. 125,581 and obviating the necessity of cutting an aperture or slot in the rim flange to receive the latching portion of the handle, the same extending beneath the rim flange to a point where it will normally engage the rim bead of the receptacle to lock the cover thereon.

Another object of the improvement is to provide a spring hinge for movably connecting the latching handle to the cover, whereby the cover will be held locked upon the receptacle even though the receptacle is tipped over or upset.

Figure 11:
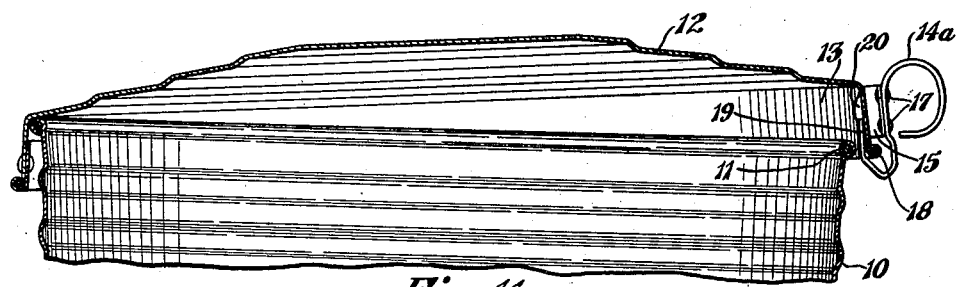
Figure 12:
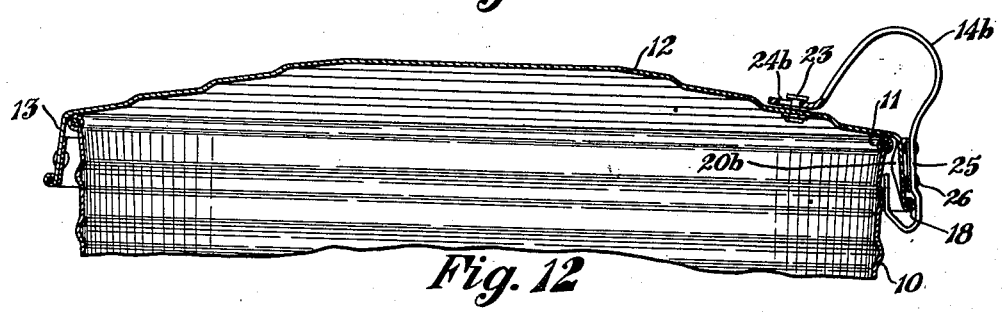
Figure 13:
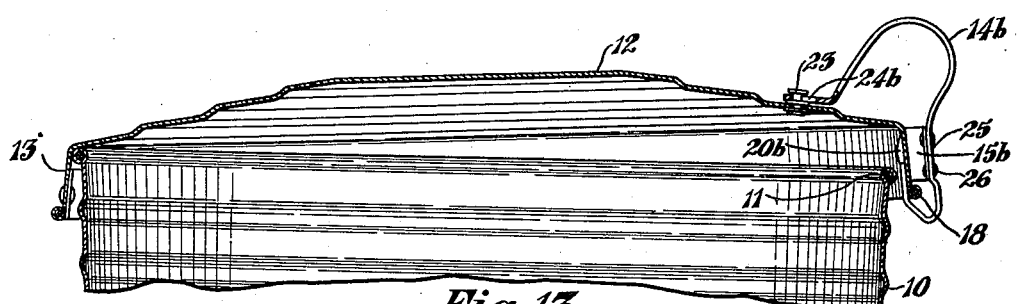
Figure 18:
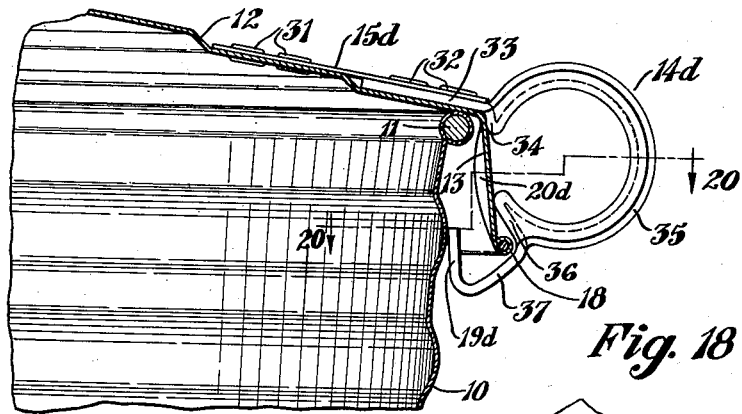
Figure 19:
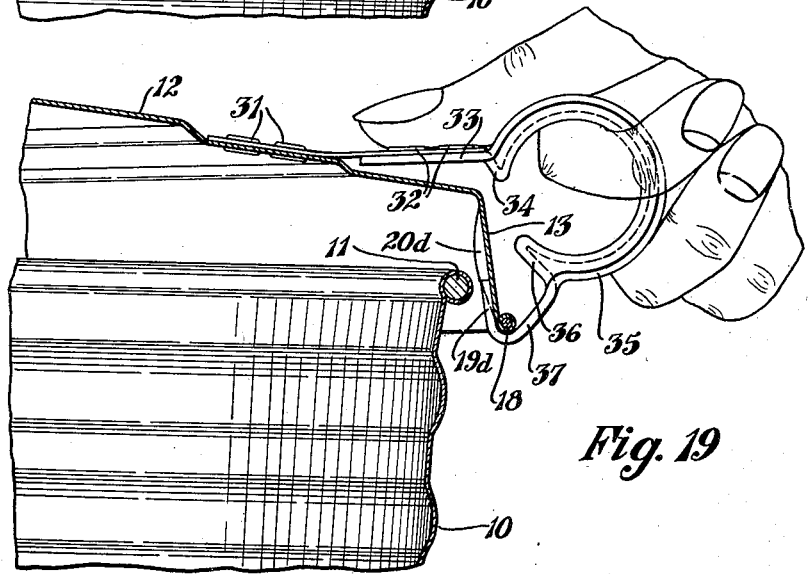
Figure 17:
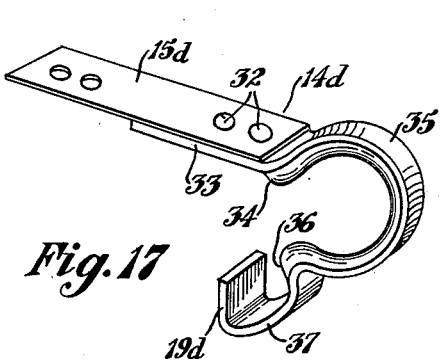

The above objects together with others which will be apparent from the drawings and following description, or which may be later referred to, may be attained by constructing the improved receptacle cover in the manner illustrated in the accompanying drawings, in which Figure 1 is a side elevation of a receptacle provided with a cover having a latching handle constructed in accordance with the invention;

Fig. 2, a detached, perspective view of one form of the improved latching handle;

Fig. 3, a similar view of another form of the latching handle;

Fig. 4, a similar view of a still further modification of the latching handle;

Fig. 5, an enlarged fragmentary longitudinal sectional view through the upper portion of the receptacle, showing the cover provided with the form of latching handle shown in Fig. 2, in locked position upon the receptacle;

Fig. 6, a similar view showing the cover tilted upon the receptacle but still remaining locked thereon;

Fig. 7, a similar view showing the manner in which the cover is unlocked from the receptacle by operation of the latching handle;

Fig. 8, an inverted fragmentary plan sectional view through the upper portion of the receptacle and the rim flange of the cover showing a usual form of means between a portion of the cover diametrically opposite to the latching handle and the receptacle providing an operative connection of the cover therewith;

Fig. 9, a similar section through the improved latching means shown in Figs. 2, 5, 6 and 7;

Fig. 10, a view similar to Fig. 5, showing the modified form of latching handle illustrated in Fig. 3 in the locked position;

Fig. 11, a view similar to Fig. 7, showing the modified form of latching handle in unlocked position as when the same is manually operated to remove the cover from the receptacle;

Fig. 12, a view similar to Figs. 5 and 10, showing the modified form of latching handle illustrated in Fig. 4 in the locked position;

Fig. 13, a view similar to Figs. 7 and 11, showing the manner in which the modified form of latching handle illustrated in Figs. 4 and 12 is operated to unlock the cover so that it may be removed from the receptacle;

Fig. 14, a detached perspective view of another and quite important modification of the latching handle, in which the spring hinge which connects the handle to the cover is located within the cover and adapted to be attached to the inside of the rim flange thereof;

Fig. 15, a fragmentary longitudinal sectional view through the upper portion of the receptacle, showing the cover provided with the form of latching handle shown in Fig. 14, in locked position upon the receptacle;

Fig. 16, a section taken as on the line 16—16, Fig. 15;

Fig. 17, a detached perspective view of the preferred form of latching handle, in which the spring hinge which connects the handle to the cover is located upon and attached to the top of the cover and disposed radially relative thereto;

Fig. 18, a fragmentary longitudinal sectional view through the upper portion of the receptacle, showing the cover provided with the form of latching handle shown in Fig. 17, in locked position upon the receptacle;

Fig. 19, a similar view showing the cover tilted and unlocked; and

Figure 20:
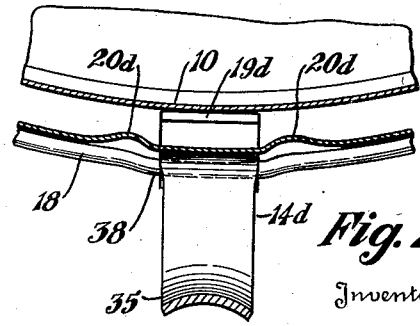

Fig. 20, a section taken as on the line 20—20, Fig. 19.

Similar numerals refer to similar parts throughout the drawings.

The self-locking cover to which the invention pertains is adapted to be employed upon a common form of receptacle such as the garbage can indicated generally at 10. As in general practice, the side wall of the receptacle adjacent to its open upper end is provided with an outwardly extending rim bead 11 which performs the usual function of strengthening and reinforcing the rim of the receptacle and also serves as a means to be engaged by the latching device associated with the cover and comprising the present invention.

The receptacle and cover are both illustrated in the drawings as being of circular form since this is the customary shape for such receptacles, but it should be understood that the cross sectional shape of both the receptacle and cover may be of any other suitable or desired configuration without departing from the spirit of the invention.

The cover for the receptacle is indicated generally at 12 and may be given any suitable and usual contour as by stamping or otherwise, so as to be properly reinforced, and is provided with the usual depending peripheral flange 13 adapted to extend downwardly over the rim bead 11 of the receptacle and to be slightly spaced therefrom, all as in usual practice and as shown in the drawings.

As illustrated in the drawings, the inner dimensions of the rim flange 13 of the cover are such that sufficient clearance is provided to permit the cover to be easily and readily placed upon and removed from the can without binding, and yet not too much clearance so that the latching handle forming an important part of the invention may not function; while at the same time the cover will fit tightly upon the can when in the closed position.

Referring first to the form of the invention shown in Figs. 2, 5, 6 and 7, the handle is indicated generally at 14 and may be made of a section of flat strip metal formed into a loop, as shown in the drawings and movably connected to the cover as by the spring 15 connected at one end to the rim flange of the cover as by rivets 16 and at its other end to the handle 14 as by rivets 17, providing a spring hinge by means of which the handle is movably connected to the cover and adapted to be normally held in locked position, as will be later described.

The outer portion of the handle 14 is bent downwardly beneath the rim bead 18 of the cover and may terminate in an upwardly extending latching portion 19 disposed beneath the rim bead 11 of the receptacle for locking or latching engagement therewith to prevent accidental displacement of the cover in the event the same is tilted relative to the receptacle, as shown in Fig. 6.

Inwardly disposed projections or wards 20 are provided upon the rim flange at each side of the latching portion 19 of the handle and are preferably of slightly greater depth than the thickness of said latching portion and preferably tapered down toward the lower edge of the rim flange, as shown. These projections or wards may be formed in any suitable and desired manner, but for the sake of simplicity and cheapness, it is preferable that they be formed by inwardly stamping or pressing portions of the rim flange as illustrated.

Preferably at a point on the rim flange 13 of the cover diametrically opposite to the latching handle above described, some means such as the spring strip 21 is provided to project inwardly for a distance sufficient to engage beneath the underside of the rim bead 11 of the receptacle and prevent dislodgement of the cover upon this side of the receptacle. This spring strip is a common form of device used for this purpose and may be connected intermediate its ends to the cover flange 13 as by the rivets 22, the opposite ends of the spring strip 21 extending beneath the bead 11.

As shown in Fig. 9, the latching portion 19 of the handle is preferably inclined transversely at an angle to the adjacent portion of the cover flange 13 so that in operating the handle to unlock the cover the leading edge of the latching portion 19 will first contact the cover flange between the projections or wards 20, after which a further outward pull upon the handle will cause the same to pivot upon this leading edge of the latching portion and to swing slightly to one side as the latching portion is drawn back against the cover flange between the projections or wards 20.

In Figs. 3, 10 and 11 is shown a slightly modified form of the invention in which the handle 14a is in the form of a small ring through which a finger may be inserted to operate the same. Otherwise all of the parts of this form of the invention may be identically the same as illustrated and above described with respect to Figs. 2, 5, 6 and 7 and the same reference numerals are applied to the drawings thereof.

The form of the invention illustrated in Figs. 4, 12 and 13 differs from the forms above described in that the latching handle 14b is movably connected or hinged to the cover as by the spring 15b, and is also supported at another point upon the cover as by the stud or rivet 23 fixed to the top of the cover and extending through the elongated slot 24b in the upper or inner end portion of the handle.

As shown in Figs. 4, 12 and 13, the handle 14b is bent or looped upward and outward, and then inward and downward to form a suitable hand grip, and then extends downward in a substantially vertical direction as indicated at 25, at which point the spring 15b is connected thereto as by the rivets 26, the other end of said spring being connected to the cover flange 13b as by the rivets 27.

The handle is then bent beneath the rim bead 18 of the cover and terminates in the upwardly disposed latching portion 19b, disposed beneath the rim bead 11 of the receptacle for locking or latching engagement therewith to prevent accidental displacement of the cover from the receptacle, the spring normally holding the parts in the position shown in Fig. 12, with the latching portion spaced inwardly from the inwardly disposed projections or wards 20b, as shown in said figure.

In Figs. 14, 15 and 16 is shown another and probably one of the most desirable forms of the invention, in which the latching handle 14c is of a type quite similar to the handle 14b shown in Figs. 4, 12 and 13 and in which the spring 15c, by means of which the handle is hinged or movably connected to the cover, is located within the cover and connected to the inner side of the flange 13 thereof, as by rivets 28 located through one end of the spring, the other end thereof being connected to the upwardly disposed latching portion 19c of the handle as by a rivet 29.

As shown in Figs. 14 and 15, the handle 14c is bent to form a suitable hand grip, the lower end thereof terminating in the upwardly disposed latching portion 19c and the upper end terminating in the inwardly disposed slotted portion 24c adapted to be slidably supported upon the top of the cover as by the stud or rivet 23c.

In this form of the invention only one inwardly disposed projection or ward 20c is necessary or desirable, the same being located upon the side of the latching handle opposite to the spring 15c, as best shown in Fig. 16.

The operation of the improved latching means as illustrated in the several figures of the drawings will be obvious from the above description but may be briefly described as follows:

Considering first the form of the invention shown in Figs. 2, 5, 6 and 7, assuming that the cover is placed upon the receptacle in the manner shown in Fig. 5, the spring will hold the latching portion of the handle in the position shown in said figure, so that the inner or upper end of the latching portion is in close proximity to the adjacent side wall of the receptacle at a point directly below the rim bead of the receptacle.

Any attempt to remove the cover from the can, without grasping and pulling outward upon the handle 14, will be opposed by the latching portion 19 of the handle engaging the underside of the rim bead 11 of the receptacle, as shown in Fig. 6.

If, however, the handle 14 is pulled outward to the position shown in Fig. 7, the latching portion 19 of the handle will be received between the inwardly disposed projections or wards 20 of the rim flange of the cover, which will thus space the latching portion of the handle sufficiently from the bead 11 of the receptacle to permit the same to clear as the cover is raised, as shown in Fig. 7.

It should be noted that in this form of the invention the latching portion of the handle is inclined transversely with respect to the adjacent portion of the rim flange of the cover so that when the handle is pulled outward the leading edge of this latching portion will first contact the rim flange of the cover, acting as a fulcrum upon which the handle and latching portion swing slightly to the broken line position shown in Fig. 9, permitting the entire latching portion 19 of the handle to swing flat against the rim flange of the cover between the projections or wards 20.

The operation of the form of the invention shown in Figs. 3, 10 and 11 is substantially identical with that above described with respect to Figs. 2, 5, 6 and 7, with the exception that the handle 14a is operated by one finger instead of using the entire hand, as provided for with the handle 14 in the other form of the invention.

Taking next the operation of the form of the invention shown in Figs. 4, 12 and 13, the same is very similar to that above described. When the handle 14b is pulled outward, the slot 24 will permit the upper end of the handle to move radially with respect to the cover, the stud 23 supporting this portion of the handle and limiting the movement thereof. Such movement of the handle will move the latching portion 19b thereof between the wards or projections 20b within the rim flange of the cover so that the latching portion will be withdrawn from a point directly beneath the rim flange 11 of the receptacle, whereby an upward pull upon the handle 14b will raise the cover clear of the receptacle in the same manner above described.

The operation of the form of the invention shown in Figs. 14, 15 and 16 is substantially the same as the operation of the form shown in Figs. 4, 12 and 13. In this form of the invention where only one projection or ward 20c is necessary, it will be seen that an outward pull upon the handle 14c will move the latching portion 19c against the inner side of the rim flange of the cover alongside of the ward or projection 20c, thus permitting the latching portion of the handle to clear the rim bead 11 of the receptacle when the handle is pulled upward to lift the cover off the receptacle.

It should be understood that while the spring is shown on the inside of the cover flange only in the form of the invention shown in Figs. 14, 15 and 16 of the drawings, all of the other forms of the invention may be provided with the internal spring instead of the external spring, as shown, without in any manner departing from the invention.

In Figs. 17 to 20 inclusive is illustrated the preferred form of the invention, in which the improved latching handle, indicated generally by the numeral 14d, is adapted to be movably or hingedly connected to the top of the cover 12 by a hinge which may be in the form of a flat spring 15d which is radially disposed upon the top of the cover and connected thereto, at its inner end, as by the rivets 31, the outer end of said spring being connected, as by the rivets 32, to the radially disposed, flat, upper end portion 33 of the handle, which is adapted to normally rest upon the top of the cover 12, as shown in Fig. 18.

As in the other forms of the invention above described, the handle may be formed of a flat strip of metal, and the portion thereof immediately adjacent to the flat end portion 33 is bent downwardly as at 34 and is then formed into a ring or loop 35, of sufficient diameter to receive one or two fingers of the operator's hand, this ring being preferably curved transversely throughout its circumference, as illustrated, so as to not only provide a more convenient and comfortable hand grip but also to strengthen the handle structure.

The handle is then bent outwardly and downwardly, as at 36, and then inwardly and downwardly, as at 37, so as to fit around and under the rim bead 13 of the cover, and terminates in the upturned latching portion 19d which is disposed between the upper portion of the receptacle and the rim flange of the cover, and is adapted to be normally located beneath the rim bead 11 of the receptacle and is held in this position by means of the spring 15d.

The inwardly disposed projections or wards 20d, of the same construction and design as the wards above described, may be located upon the inner side of the cover flange 13, on each side of the latching portion 19d of the handle as shown.

The rim flange 13 of the cover may be slightly flared outward in this form of the invention, as well as in the above described forms, and if desired, instead of flaring the cover around its entire circumference, this flare may be only at a point between the projections or wards 20d, as shown at 38 in Fig. 20.

The operation of this form of the invention is quite similar to those above described. It will be seen that any attempt to remove the cover from the can, without manipulating the handle, will be opposed by the latching portion 19d of the handle engaging the underside of the rim bead 11 of the receptacle. If, however, the handle 14d is pulled upward to the position shown in Fig. 19, the latching portion 19d thereof will be pulled against the inner wall of the rim flange 13 of the cover, moving the latching portion away from a position beneath the rim bead 11 of the can so as to permit the same to clear as the cover is raised as shown in said figure.

It has been found that in operating this form of the invention, the handle is more easily manipulated by pressing the thumb down upon the top of the cover or spring, as the finger pulls up upon the ring portion of the handle.

Cover locks made in accordance with the invention have a number of decided advantages over the types of devices shown in the several patents above referred to. By omitting the usual aperture or slot necessary in the patented structures to receive the latching portion of the handle, the cover not only has a better appearance, but is a better article for sanitary reasons and is not subject to the danger of rust or corrosion around the aperture.

Furthermore, the spring hinge by means of which the various forms of handles may be attached to the cover provide a more secure lock than the gravity operated devices shown in the prior patents. It has been found by experience that when a can, provided with one of these gravity operated cover locks, is tipped over, the latching handle very frequently is unlocked by the impact of the falling can, permitting the cover to fall off the can so that animals may strew the contents of the can around the premises.

With applicant's improved device the can may be upset, or thrown and rolled into any position without the possibility of the latching handle becoming unlocked, as the spring hinge holds the same in locked position at all times except when the handle is manipulated to unlock the same.

I claim:

1. The combination with a receptacle having an external bead adjacent to its open end, of a cover for said receptacle having a depending imperforate rim flange extending downwardly over said bead, a manipulating and latching handle movably mounted upon the cover, the lower free end of the handle extending beneath the rim flange and terminating in an upwardly disposed raw edge comprising a locking projection normally positioned beneath said bead, and an inwardly disposed projection on the rim flange at one side of said locking projection, and of slightly greater depth than said locking projection.

2. The combination with a receptacle having an external bead adjacent to its open end, of a cover for said receptacle having a depending imperforate rim flange extending downwardly over said bead, a manipulating and latching handle movably mounted upon the cover, the lower free end of the handle extending beneath the rim flange and terminating in an upwardly disposed raw edge comprising a locking projection normally positioned beneath said bead, and an inwardly disposed projection on the rim flange at each side of said locking projection, and of slightly greater depth than said locking projection.

3. The combination with a receptacle having an external bead adjacent to its open end, of a cover for said receptacle having a depending imperforate rim flange extending downwardly over said bead, a manipulating and latching handle, a spring for movably mounting said handle upon the cover, the lower free end of the handle extending beneath the rim flange and terminating in an upwardly disposed raw edge comprising a locking projection normally positioned beneath said bead, and an inwardly disposed projection on the rim flange at one side of said locking projection, and of slightly greater depth than said locking projection.

4. The combination with a receptacle having an external bead adjacent to its open end, of a cover for said receptacle having a depending imperforate rim flange extending downwardly over said bead, a manipulating and latching handle, a spring for movably mounting said handle upon the cover, the lower free end of the handle extending beneath the rim flange and terminating in an upwardly disposed raw edge comprising a locking projection normally positioned beneath said bead, and an inwardly disposed propection on the rim flange at each side of said locking projection, and of slightly greater depth than said locking projection.

5. The combination with a receptacle having an external bead adjacent to its open end, of a cover for said receptacle having a depending rim flange extending downwardly over said bead, a manipulating and latching handle, a spring for movably mounting said handle upon the cover, the upper end of the handle being slidably connected to the cover and the lower end of the handle extending beneath the rim flange and terminating between the side wall of the receptacle and the rim flange of the cover and comprising a locking projection normally positioned beneath said bead, and an inwardly disposed projection on the rim flange at one side of said locking projection, and of slightly greater depth than said locking projection.

6. The combination with a receptacle having an external bead adjacent to its open end, of a cover for said receptacle having a depending rim flange extending downwardly over said bead, a manipulating and latching handle, a spring for movably mounting said handle upon the cover, the upper end of the handle being slidably connected to the cover and the lower end of the handle extending beneath the rim flange and terminating between the side wall of the receptacle and the rim flange of the cover and comprising a locking projection normally positioned beneath said bead, and an inwardly disposed projection on the rim flange at each side of said locking projection, and of slightly greater depth than said locking projection.

7. The combination with a receptacle having an external bead adjacent to its open end, of a cover for said receptacle having a depending rim flange extending downwardly over said bead, a manipulating and latching handle, a spring upon the inside of said rim flange for movably mounting said handle upon the cover, the lower end of the handle extending beneath the rim flange and terminating beneath the side wall of the receptacle and the rim flange of the cover and comprising a locking projection normally positioned beneath said bead, and an inwardly disposed projection on the rim flange at one side of said locking projection, and of slightly greater depth than said locking projection.

8. The combination with a receptacle having an external bead adjacent to its open end, of a cover for said receptacle having a depending rim flange extending downwardly over said bead, a manipulating and latching handle, a spring upon the inside of said rim flange for movably mounting said handle upon the cover, the lower end of the handle extending beneath the rim flange and terminating between the side wall of the receptacle and the rim flange of the cover and comprising a locking projection normally positioned beneath said bead, and an inwardly disposed projection on the rim flange at one side of said locking projection, and of slightly greater depth than said locking projection.

9. The combination with a receptacle having an external bead adjacent to its open end, of a cover for said receptacle having a depending rim flange extending downwardly over said bead, a manipulating and latching handle, a spring upon the inside of said rim flange for movably mounting said handle upon the cover, the upper end of the handle being slidably connected to the cover and the lower end of the handle extending beneath the rim flange and terminating between the side wall of the receptacle and the rim flange of the cover and comprising a locking projection normally positioned beneath said bead, and an inwardly disposed projection on the rim flange at one side of said locking projection, and of slightly greater depth than said locking projection.

10. The combination with a receptacle having an external bead adjacent to its open end, of a cover for said receptacle having a depending rim flange extending downwardly over said bead, a manipulating and latching handle, a spring upon the inside of said rim flange for movably mounting said handle upon the cover, the upper end of the handle being slidably connected to the cover and the lower end of the handle extending beneath the rim flange and terminating between the side wall of the receptacle and the rim flange of the cover and comprising a locking projection normally positioned beneath said bead, and an inwardly disposed projection on the rim flange at one side of said locking projection, and of slightly greater depth than said locking projection.

11. The combination with a receptacle having an external bead adjacent to its open end, of a cover for said receptacle having a depending imperforate rim flange extending downwardly over said bead, a manipulating and latching handle movably mounted upon the cover, the lower free end of the handle extending beneath the rim flange and terminating between the side wall of the receptacle and the rim flange of the cover in an upwardly disposed raw edge comprising a locking projection normally positioned beneath said bead, the handle being arranged to be manually moved relative to the cover to withdraw said locking projection from beneath said rim bead.

12. The combination with a receptacle having an external bead adjacent to its open end, of a cover for said receptacle having a depending imperforate rim flange, a manipulating and latching handle having its upper end hingedly connected to the top of the cover, a loop between the upper and lower ends of the handle, the lower end of the handle extending around and beneath the rim flange and terminating in a locking projection positioned beneath said bead.

13. The combination with a receptacle having an external bead adjacent to its open end, of a cover for said receptacle having a depending rim flange terminating in a rim bead, a manipulating and latching handle having a flat upper end hingedly connected to the top of the cover, the handle being then bent downwardly against the rim flange and then outwardly to form a loop, then upwardly against the rim flange, and then around and beneath the rim bead of the cover and terminating in a locking projection positioned beneath the bead of the receptacle.

14. The combination with a receptacle having an external bead adjacent to its open end, of a cover for said receptacle having a depending imperforate rim flange, a manipulating and latching handle having its upper end hingedly connected by a spring to the top of the cover, a loop between the upper and lower ends of the handle, the lower end of the handle extending around and beneath the rim flange and terminating in a locking projection positioned beneath said bead.

15. The combination with a receptacle having an external bead adjacent to its open end, of a cover for said receptacle having a depending rim flange terminating in a rim bead, a manipulating and latching handle having a flat upper end hingedly connected to the top of the cover, the handle being then bent downwardly against the rim flange and then outwardly to form a loop, then upwardly against the rim flange, and then around and beneath the rim bead of the cover and terminating in an upwardly disposed locking projection positioned beneath the bead of the receptacle.

16. In combination with a receptacle having laterally projecting means at its open end, a cover having a depending imperforate flange adapted to overlie and enclose said projecting means, and a latch having its upper end portion hingedly connected to the top of the cover, the lower end of the latch extending around and beneath the depending flange and terminating in a locking projection positioned beneath said projecting means.

17. In combination with a receptacle having laterally projecting means at its open end, a cover having a depending imperforate flange adapted to overlie and enclose said projecting means, and a latch having its upper end portion hingedly connected to the top of the cover, the lower end of the latch extending around and beneath the depending flange and terminating in an upturned locking projection positioned beneath said projecting means.

18. In combination with a receptacle having laterally projecting means at its open end, a cover having a depending imperforate flange adapted to overlie and enclose said projecting means, and a latch having its upper end portion hingedly connected to the top of the cover, the lower end of the latch extending around and beneath the depending flange and terminating in a locking projection positioned beneath said projecting means, and an outwardly disposed handle portion intermediate the upper and lower ends of the latch.

ROWLAND G. CURTIS.